Aug. 22, 1967 E. C. DOWLING 3,337,857

DRIVER CIRCUIT FOR MAGNETIC CORE DEVICES

Filed Aug. 16, 1963 2 Sheets-Sheet 1

INVENTOR.
EDWARD C. DOWLING

BY

Curtis, Morris and Safford
ATTORNEYS

DRIVER CIRCUIT FOR MAGNETIC CORE DEVICES

Filed Aug. 16, 1963 2 Sheets-Sheet 2

INVENTOR.
EDWARD C. DOWLING

BY

Curtis, Morris and Safford
ATTORNEYS

United States Patent Office 3,337,857

Patented Aug. 22, 1967

3,337,857
DRIVER CIRCUIT FOR MAGNETIC CORE DEVICES

Edward C. Dowling, Harrisburg, Pa., assignor to AMP Incorporated, Harrisburg, Pa.

Filed Aug. 16, 1963, Ser. No. 302,610
8 Claims. (Cl. 340—174)

This invention relates to circuit improvements for magnetic core devices of the type utilized to manipulate binary intelligence.

In U.S. patent application, Ser. No. 52,295, filed Aug. 26, 1960, now U.S. Patent No. 3,221,176 and entitled Drive Circuit, the inventors, W. P. Fritz and J. H. Whitley, describe a self-priming drive circuit for magnetic core shift registers and the like, which is highly efficient and quite reliable. Because of its advantages, the circuit developed by Fritz and Whitley has been extensively used in the various magnetic core devices employing the odd-even advance and prime scheme. In straight-forward applications the Fritz and Whitley driver works quite well in the manner stressed in their description. In certain other applications, wherein the driven magnetic device is called upon to perform more complicated intelligence handling tasks and must include an additional winding through the magnetic cores to perform a clear and reset function, problems have arisen with respect to the accidental firing of portions of the circuit caused by transformer action between the advance and additional windings. The required addition of the clear-reset function has also caused problems with respect to accomplishing the priming operation to assure an adequate intelligence transfer.

The present invention, as a general object, is directed to a solution to the foregoing problems.

A specific object of the invention is to provide a novel driver circuit for magnetic core devices including a clear-reset function capable of reliable operation.

Another object of the invention is to provide a novel driver circuit for magnetic cores which inherently precludes the accidental firing of any branch of the circuit due to transformer action between windings on any core of a number of cores.

Yet another object of the invention is to provide a simple and inexpensive clear-reset circuit addition to standard driver circuits which automatically provides prime current following each clear-reset operation.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention, but are given for purposes of illustration in order that others skilled in the art may fully understand the invention and the principles thereof and the manner of applying it in practical use so that they may modify it in various forms, each as may be best suited to the conditions of a particular use.

The invention achieves the foregoing objects through the use of a unique connection between an added driver portion responsible for clear-reset functions and part of a standard driver, which accomplishes two distinct advantages. First, the novel connection makes it impossible for transformer induced voltage spikes to mistrigger the solid state switches of either the added driver portion or the standard driver. Second, the connection in conjunction with the clear-reset portion of the driver automatically provides a priming MMF following each clear-reset MMF to preclude the loss of intelligence due to non-priming.

Figure 3:
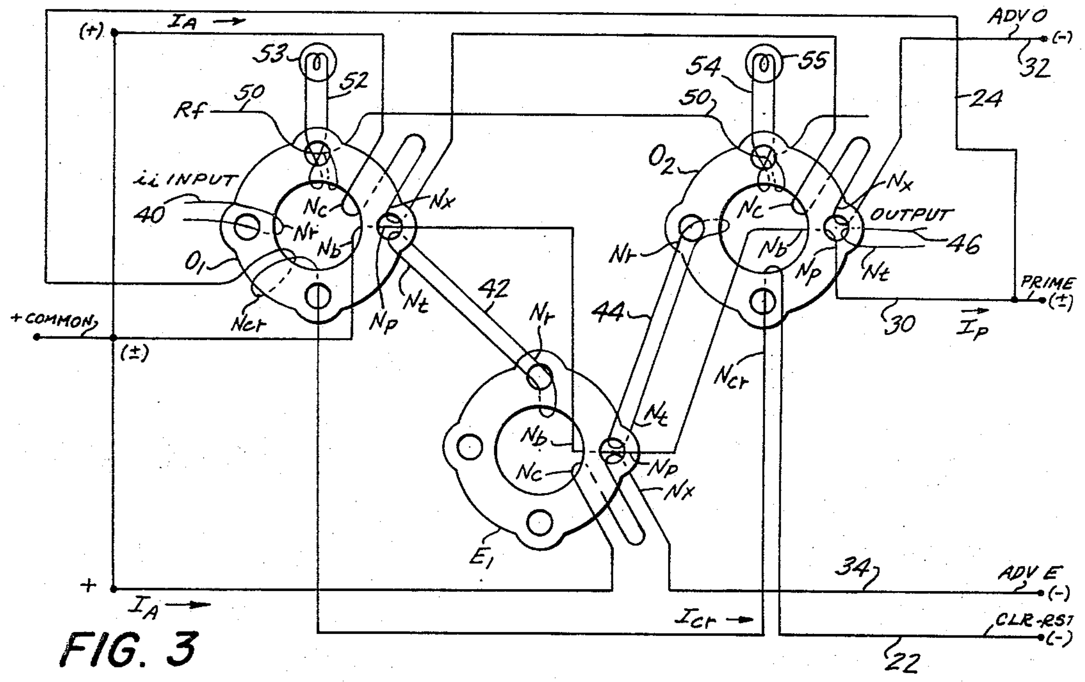
FIGURE 3 is a schematic diagram showing three of a number of cores appropriately wound to be driven by the circuit of FIGURE 1 to perform an intelligence handling function.

Before turning to a detailed description of the invention, the problems solved by the invention will first be outlined. Referring to FIGURE 3, there is shown a representative MAD–R (Multi-Aperture Device–Resistance) circuit including O (odd) and E (even) cores arranged for shift register use. As is well appreciated, the term shift register is merely a generic phrase for a device which can controllably shift registered intelligence and as such is intended to reference the various specific kinds of shift registers including counters, decoders, buffers and various sorts of intelligence routing and logic devices. The general operation of the multi-aperture core shift register of the type shown in FIGURE 3 is described in U.S. Patent No. 2,995,731, to J. P. Sweeney.

Briefly summarized, the device of FIGURE 3 includes cores of magnetic material having relatively square hysteresis loops capable of being driven to defined stable states or remanence. Each core includes a central major aperture and a number of minor apertures disposed within the core material about the major aperture. Intelligence is transferred into, through and out of the device by means of coupling loops 40, 42, 44 and 46, respectively through turns $N_t$ (transmit) and $N_r$ (receive). Assuming the core $O_1$ to be in the clear (negatively saturated) remanence state, an input pulse on winding 40 of a sufficiently magnitude relative to the core material threshold will operate to develop an MMF $N_r i_1$ to MAD-set (positively saturated approximately half the core material) the core and thus change its state from an intelligence content of zero to that of one. An input $i_1$ of a zero level or a very reduced level will, of course, not switch remanent flux in core $O_1$ and will therefore leave the core in the intelligence state of zero. Transfer along the register is achieved in the manner described in the above mentioned patent to J. P. Sweeney, by drive currents applied in the proper sequence, to develop MMF's by appropriate turns N linking the cores. This sequence includes a first application of a priming current $I_P$ via a lead 30 to develop an MMF, $N_b I_P$, $N_p I_P$, which operates, assuming a set core, to switch flux locally about the transmitting minor aperture threaded by coupling loop 42 without disturbing the flux disposition about the core major aperture. After the priming operation an ADV. O, MMF, $N_c I_A$, $N_x I_A$, is applied by current $I_A$ in lead 32 to drive the core into the clear state, thereby switching flux under the windings turns $N_t$ to develop a current in loop 42, which operates to set the succeeding core $E_1$. Thereafter a further priming phase followed by an ADV. E pulse through lead 34 operates to transfer the intelligence bit from core $E_1$ through coupling loop 44 to core $O_2$ which, in turn, is driven to produce an output on loop 46. Loop 46 may of course, be connected to some utility device capable of being operated by the type of pulse produced, or may be connected to a further core such as a core $E_2$, not shown, in general shift register applications. Linking each of the cores $O_1$ and $O_2$ is an RF drive winding 50 and output windings 52 and 54 connected to read out devices such as signal lamps 53 and 55. This circuit is as described in U.S. patent application, Ser. No. 249,466, filed Jan. 4, 1962, in the names of J. C. Mallinson and J. P. Sweeney.

Also included in the circuit shown in FIGURE 3, is a lead 22 from a clear-reset source developing a current $I_{CR}$ imposed on cores by turns $N_{cr}$ to provide an MMF, $N_{cr}$ $I_{CR}$, adapted to clear or set the cores in a predetermined pattern. The clear-reset function thus accomplished is frequently used for encoding, decoding, counting and logic applications wherein, prior to a given operation, the cores are driven to an initial intelligence content such as all zero or to a defined pattern of ones and zeros. The polarity indicated with respect to lead 22 and the sense of turns $N_{cr}$ is such as to fully clear $O_1$ and MAD-set $O_2$. This is, of course, by way of example and could be such as to define other clear-set patterns.

One of the problems with circuits having a separate clear-reset circuit is caused by back voltages induced in the advance turns $N_c$ and $N_x$ as each core is switched by the MMF, $N_{cr}$ $I_{CR}$, or, alternatively, by back voltages induced in the turns $N_{cr}$ as the core is switched by the MMF's, $N_c$ $I_A$, $N_x$ $I_A$ as the cores are cleared. These back voltages have been found to cause accidental triggering of drive circuits of the Fritz and Whitley type above described.

Figure 1:
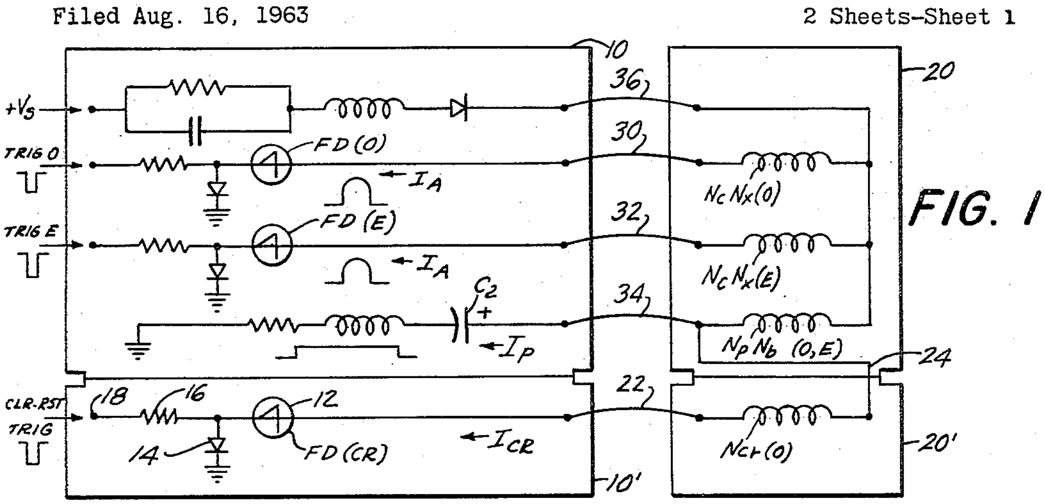
FIGURE 1 is a schematic diagram of the novel circuit of the invention in one embodiment in conjunction with a driver circuit of the prior art.

In FIGURE 1, the left block 10 represents a driver adapted to effect the proper phase of operation for a multi-aperture magnetic core shift register shown schematically in block 20. The circuit shown in block 10 is essentially the same as that in the above mentioned application to Fritz and Whitley, and operates as there described to supply properly phased current pulses $I_A$ to winding turns $N_c$ and $N_x$ and current pulses $I_P$ through turns $N_b$ and $N_p$ linking the O and E cores as shown in FIGURE 3 of the instant application. The circuit improvement of the invention is shown as a part of the driver labeled 10′ and a part of the shift register labeled 20′ interconnected to provide a clear-reset function. The clear-reset turns $N_{cr}$ for the O cores are, as shown, magnetically linked to the other turns of the register 20. The operation of the circuit of the invention may be better understood by viewing FIGURE 2 and the time sequence diagram which depicts the phases of operation of the different portions of the circuit of FIGURE 1.

Figure 2:
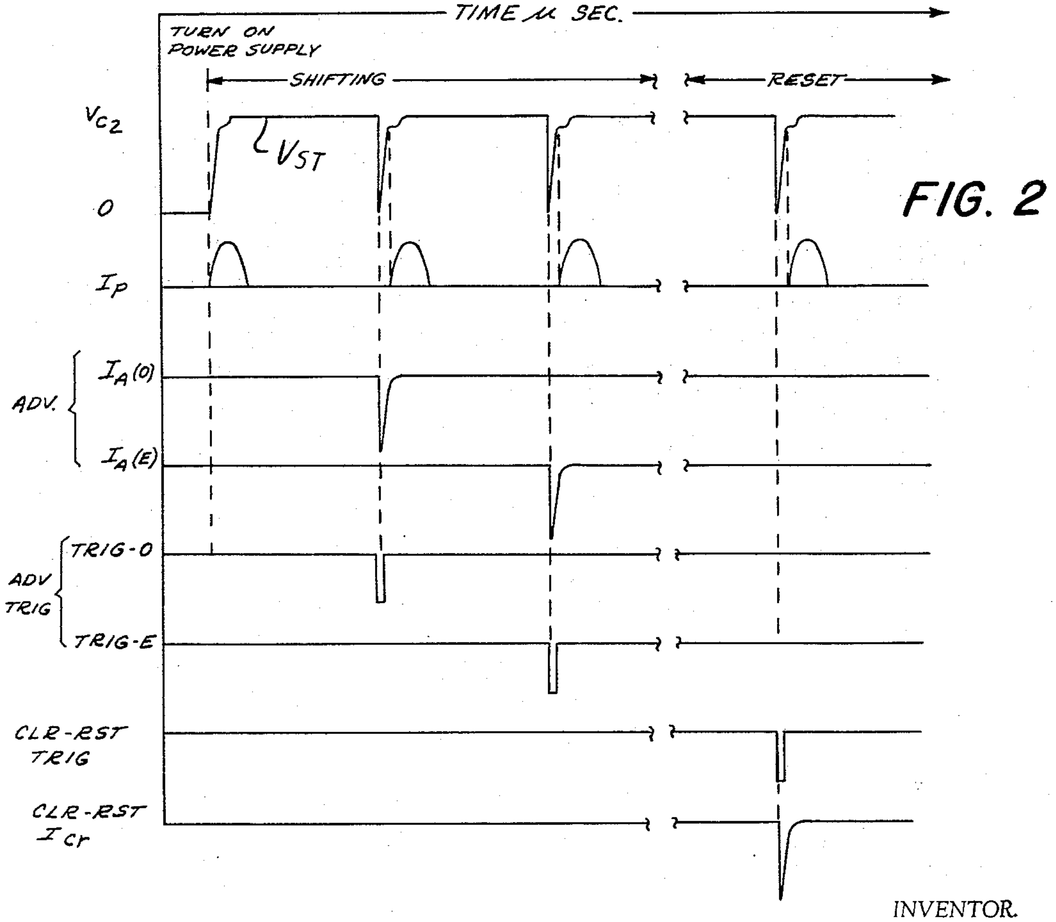
FIGURE 2 is a time sequence diagram showing the operation of the circuit shown in FIGURE 1.

As can be seen from FIGURE 2, following the application of a prime pulse $I_P$, a trigger pulse Trig O is applied to cause the four-layer diode FD (O) to be driven to conduction to develop an advance pulse $I_A$ (O). This sequence operates to effect a transfer of intelligence from the O cores to the E cores; e.g., from $O_1$ to $E_1$ via loop 42, as shown in FIGURE 3. At some time thereafter, the E cores are primed by a pulse $I_P$ for a subsequent transfer to the succeeding O cores. Thus, an advance trigger, Trig E, causes four-layer diode FD (E) to conduct developing advance pulse $I_A$ (E) to advance intelligence from the E to the O cores; e.g., in FIGURE 3 core $E_1$ to core $O_2$. The application to Fritz and Whitley fully explains the operation of the driver circuit thus described with respect to the conduction and extinction of the four-layer diodes FD and the pulse shaping accomplished by the remainder of the circuit shown.

As each four-layer diode FD conducts the current $I_A$ developed in the appropriate turns $N_c$ and $N_x$ will switch flux under the turns $N_{cr}$ of 20′ causing an induced voltage spike in the clear-reset circuit 10′. It will be readily understood that if the clear-reset circuit were separately supplied, the induced voltage could cause the four-layer diode FD (CR) shown as 12, to fire. This has been the case and has caused considerable trouble with respect to the reliable operation of magnetic devices including circuits having other types of switches than four-layer diodes.

The improvement of the invention includes, as a supply for the clear-reset, circuit 10′, from lead 22 and turns $N_{cr}$ to a direct connection to the prime circuit lead 34. The circuit 10′ is similar to the advance branches of driver 10 and includes four-layer diode 12, a path to ground via a diode 14, a resistor 16 and a trigger input terminal 18 supplied by a suitable pulse source. Through this circuit the clear-reset MMF is developed by the discharge of capacitor $C_2$ in the same way that advance MMF is developed; namely, after $C_2$ has been charged by prime current $I_P$ to a voltage level $V_{C2}$. This is shown in FIGURE 2 wherein $V_{C2}$ rises from zero to approximately $V_{st}$ in accordance with capacitor charging characteristics. Further from FIGURE 2, it will be apparent that the application of the clear-reset trigger and issuing clear-reset pulse $I_{cr}$ will immediately operate to drop the voltage $V_{C2}$ to zero as $C_2$ is discharged. This means that even though an induced voltage in the advance turns $N_c$ and $N_x$ may be expressed as a voltage drop across the four-layer diodes of the advance circuit, such cannot cause misfiring because the capacitor $C_2$ is, at that point in time, substantially discharged. Alternatively, the application of advance MMF through the conduction of FD (O) or FD (E) following each Trig. O or Trig. E pulse operates to effectively drain capacitor $C_2$ in the same way to preclude the misfiring of FD (CR). In this way the circuit shown in FIGURE 1 adds a clear-reset function to a standard shift register and at the same time eliminates the possibility of mis-triggering either the advance or the clear-reset branches thereof due to transients caused by transformer action between advance and clear-reset turns $N_c$, $N_x$ and $N_{cr}$.

An even more important aspect of the improved circuit of the invention is further depicted in FIGURE 2, wherein following each advance pulse $I_A$ and also each clear-reset pulse $I_{CR}$ there is automatically included a charging of capacitor $C_2$, which produces a prime pulse $I_P$. This is due to the fact that $C_2$ is drained by $I_{CR}$ in the same was as by $I_A$ as described in the application of Fritz and Whitley. With respect to the clear-reset function as shown in block 10′, the prior art use of a separate clear-reset circuit, caused a problem in that after any core or pattern of cores had been set, either the prime circuit for the device had to be separately energized or a separate prime circuit provided. If the prime pulse were not applied, then upon the following advance, the intelligence set into the cores would be lost due to the lack of priming. Additionally, with the type of set (MAD-set) required for RF readout, other more obvious approaches are not feasible. For example, considering that RF readout is required with respect to a standard prior art circuit providing clear-reset, one might be tempted to utilize a full MAD set input (positive saturation) such that no following prime would be required. This, however, would not provide static readout since substantially no flux could be switched under the output loop by the RF drive. If a MAD–R set is used to thus achieve static readout, then there will occur no transfer assuming no following prime. The circuit of the invention provides an immediate static output representative of the intelligence pattern of clear and set cores accomplished by clear-reset and additionally a proper transfer upon the next advance phase. By incorporating the clear-reset function into 10 to operate in the same manner as the advance circuit, the provision of priming automatically following each advance or reset pulse is achieved without a separate prime trigger or prime circuit and the incident problem of synchronization.

Figure 4:
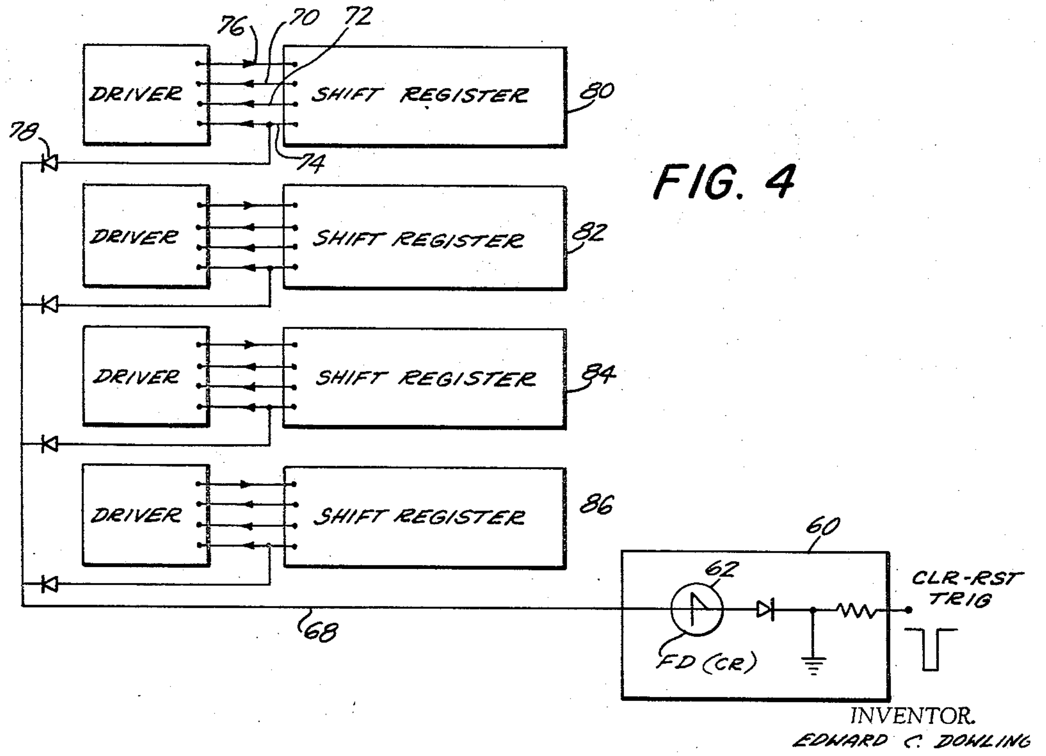
FIGURE 4 is a block and schematic diagram showing the use of the improved circuit of the invention in a further embodiment.

In FIGURE 4, a further use of the circuit improvement of the invention is shown wherein a single clear-reset circuit 60 is adapted to serve a plurality of driver-shift register units such as the four shown as 80, 82, 84 and 86. Each of the driver-shift register units may be considered as similar to the device shown in FIGURE 1, less portion 10′. Thus, the driver-shift register unit 80 is identical to driver 10 and 20 and 20′ connected by leads 70, 72, 74 and 76, analogous in function to leads 30, 32, 34 and 36, respectively, of FIGURE 1. Tied to each portion of the prime circuit is a lead 68 similar to 22 of the circuit of FIGURE 1, with each lead including an isolating diode such as 78 individual to each driver-shift register combination. The clear-reset circuit 60 includes a four-layer diode and isolating circuit common to all driver-shift register units and, of course, of appropriate ratings for the additional duty.

With the circuit shown in FIGURE 4, the body of shift registers may be simultaneously driven with a pattern of one-zero intelligence and automatically primed to prepare the registers for use.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:

1. A magnetic core device of the type including a plurality of cores adapted to be driven to transfer intelligence by an applied MMF, a prime winding linking said plurality of cores and an advance winding linking half of said plurality of cores, the said prime and advance windings being connected to a capacitor with means to charge said capacitor through said prime winding and discharge said capacitor through the said advance winding to supply said MMF, a further winding linking the said half of said cores linked by said advance winding to provide clear-reset drive to each core to establish a desired pattern of intelligence within said cores, the said further winding being connected to junction of the charging terminal of said capacitor and the said prime winding to cause said capacitor to discharge through said further winding to supply clear or set MMF to said cores.

2. The device of claim 1, wherein there is included a current source connected to said prime winding through a path so that following discharge of said capacitor through either said advance or further windings the said capacitor will be automatically charged through said prime winding to apply MMF to said cores.

3. The device of claim 1, wherein the advance and said further windings are each in separate series paths including a separate switch having an on threshold greater than the charged voltage of said capacitor and there is further included a trigger source for each said path which, when applied, is sufficient to bias each switch on to provide a path of discharge for said capacitor.

4. An intelligence handling device of the type wherein defined states of magnetization representative of intelligence are transferred in a controlled manner into, between and out of coupled magnetic cores by applied MMF drive of prime and advance phases, including a prime winding linking each core of a plurality of cores, a source of prime current, an advance winding linking half of said plurality of said cores and a clear-reset winding linking at least one of the cores of said half of said plurality of cores linked by said advance winding, a common source of current for said advance and clear-reset windings connected to said advance windings through said prime winding and connected to said clear-reset winding at the junction of said source and said prime winding with means to supply current pulses to either of said windings from said common source in a controlled manner through a switch normally biased off, the energization of either advance or clear-reset windings by an associated switch operating to temporarily block energization of the other switch.

5. A magnetic core device including a plurality of magnetic cores coupled to transfer intelligence responsive to drive by phased prime and advance currents through prime windings linking said cores and advance windings linking said cores including a first advance winding linking one half of said cores and a second advance winding linking the other half of said cores, a clear-reset winding linking at least one of the said cores in common with said first advance winding and both said first and second advance windings and said clear-reset windings including, in circuit, a triggerable switch to provide current flow through the advance or clear-reset windings from a common source, the said circuit including a connection from said source through said prime winding to said advance windings and the said clear-reset winding being connected directly to said source at the junction of said source and said prime winding whereby the energization of either of the triggerable switches of advance or clear-reset windings drops the voltage of said source to prevent the switch associated with the other windings from being energized by transients.

6. The device of claim 5, wherein the common source for the advance and clear-reset windings is supplied by a further source through said prime winding including a circuit connection to automatically supply said further source following energization of either said advance or clear-reset windings.

7. The device of claim 5, wherein the said separate sources are supplied through the prime winding from a further source and there is a connection automatically supplying said prime winding following energization of either clear-reset windings or advance windings.

8. A magnetic core system including groups of magnetic cores coupled to transfer intelligence with each group driven by phased prime and advance currents through separate prime windings and first and second separate advance windings linking the said cores of each group, a clear-reset winding for each group of cores linking only the cores threaded by the said first advance windings, a path commoned to all clear-reset windings of the said groups including a common triggerable switch normally off, a separate source of advance current operable to supply current responsive to the energization of a further triggerable switch for each group of cores connected to each advance winding, each source also being connected to each clear-reset winding at the junction of a source and a prime winding so that upon operation of the said common triggerable switch the separate sources will drive said clear-reset windings through said commoned path without energizing said prime winding.

No references cited.

BERNARD KONICK, *Primary Examiner.*

R. MORGANSTERN, *Assistant Examiner.*